United States Patent
Stella et al.

(10) Patent No.: US 10,717,507 B2
(45) Date of Patent: Jul. 21, 2020

(54) BACK PACK CINCH AND BUOYANCY COMPENSATION DEVICE

(71) Applicants: Joseph B. Stella, Ipswich, MA (US); Bradley E. Lally, San Diego, CA (US); Corrado Cominetti, Genoa (IT); Alberto Belloni, Genoa (IT)

(72) Inventors: Joseph B. Stella, Ipswich, MA (US); Bradley E. Lally, San Diego, CA (US); Corrado Cominetti, Genoa (IT); Alberto Belloni, Genoa (IT)

(73) Assignee: Johnson Outdoors Inc., Racine, WI (US)

( * ) Notice: Subject to any disclaimer, the term of this patent is extended or adjusted under 35 U.S.C. 154(b) by 0 days.

(21) Appl. No.: 16/137,188

(22) Filed: Sep. 20, 2018

(65) Prior Publication Data

US 2019/0092439 A1    Mar. 28, 2019

Related U.S. Application Data

(60) Provisional application No. 62/562,808, filed on Sep. 25, 2017.

(51) Int. Cl.
*B63C 11/22* (2006.01)
*B63C 11/30* (2006.01)
(Continued)

(52) U.S. Cl.
CPC .............. *B63C 11/22* (2013.01); *B63C 11/30* (2013.01); *F16B 2/005* (2013.01); *F16B 2/08* (2013.01);
(Continued)

(58) Field of Classification Search
CPC ............ B63C 11/22; B63C 2011/2281; B63C 2011/085; B63C 2011/303; B63C 11/2245; B63C 2011/026; A45F 3/10
See application file for complete search history.

(56) References Cited

U.S. PATENT DOCUMENTS 3,033,431 A    5/1962  Henderson
3,957,183 A    5/1976  Gadberry
(Continued)

FOREIGN PATENT DOCUMENTS

| EP | 0 215 704 A1 | 3/1987 |
|---|---|---|
| JP | 02-025389 U | 2/1990 |
| JP | 08-258788 A | 10/1996 |

OTHER PUBLICATIONS

U.S. Appl. No. 15/706,042, Rossi et al., filed Sep. 15, 2017.
(Continued)

*Primary Examiner* — Sean D Andrish
(74) *Attorney, Agent, or Firm* — Reinhart Boerner Van Deuren P.C.

(57) ABSTRACT

A back pack cinch for a strap securing a breathing tank, and an associated buoyancy compensation device worn by a driver are provided. The back pack cinch includes a cinch body. A cover is rotatably mounted to the cinch body. The cover has an open position and a closed position. The cover in the closed position is configured to tension a strap. A tab is rotatably mounted to the cinch body. The tab has an open position and a closed position. In the closed position, a portion of the strap is pressed against the serrated bearing surface by the tab to hold the portion of the strap in a fixed position.

20 Claims, 4 Drawing Sheets (51) Int. Cl.
*F16B 2/08* (2006.01)
*F16B 2/00* (2006.01)
*F16B 2/18* (2006.01)

(52) U.S. Cl.
CPC . *B63C 2011/2281* (2013.01); *B63C 2011/303* (2013.01); *F16B 2/185* (2013.01)

(56) References Cited

U.S. PATENT DOCUMENTS

| | | |
|---|---|---|
| 4,310,110 A | 1/1982 | Dexter |
| 4,690,314 A | 9/1987 | Faulconer et al. |
| 4,778,307 A | 10/1988 | Faulconer |
| 4,796,337 A * | 1/1989 | Marxer ............. A43C 11/1413 24/68 SK |
| 5,046,894 A | 9/1991 | Bergstrom |
| 5,346,419 A | 9/1994 | Kaiser |
| 5,378,084 A | 1/1995 | Walters et al. |
| 5,567,084 A | 10/1996 | Oliver |
| 5,626,439 A | 5/1997 | Rowlands |
| 5,662,433 A | 9/1997 | Seligman |
| 6,402,429 B1 | 6/2002 | James |
| 6,409,429 B1 | 6/2002 | Belloni |
| 6,503,114 B2 | 1/2003 | Kawashima et al. |
| 6,749,370 B1 | 6/2004 | Urabe et al. |
| 6,805,519 B1 | 10/2004 | Courtney |
| 7,001,107 B2 | 2/2006 | Matsuoka |
| 7,052,211 B1 | 5/2006 | Curry |
| 7,367,749 B2 | 5/2008 | Kim |
| 7,540,690 B2 | 6/2009 | Garcia et al. |
| 8,006,877 B2 | 8/2011 | Lowry et al. |
| 8,398,337 B2 | 3/2013 | Jablonski |
| 2006/0032028 A1 | 2/2006 | Takeuchi et al. |
| 2006/0175492 A1 | 8/2006 | Cooper |
| 2009/0178256 A1 | 7/2009 | Toth |
| 2010/0282793 A1 | 11/2010 | Wrigley et al. |
| 2011/0197406 A1 | 8/2011 | Couzyn |
| 2015/0144674 A1 | 5/2015 | Losos et al. |
| 2016/0360871 A1 * | 12/2016 | Schessel .................. A45F 5/00 |

OTHER PUBLICATIONS

Halcyon Traveler BC System | Diving—diveinstinct.com; 3 pages printed from the internet; date last visited Mar. 7, 2015; http://diveinstinct.com/halcyon-traveler-bc-system-1042.

Halcyon Cinch Quick—Adjust Harness Upgrade; 3 pages printed from the internet; date last visited Mar. 7, 2015; http://add-heliunn.shoplightspeed.com/halcyon-halcyon-standard-cinch-quick-adjust-harnes.html.

* cited by examiner

BACK PACK CINCH AND BUOYANCY COMPENSATION DEVICE

CROSS-REFERENCE TO RELATED PATENT APPLICATION

This patent application claims the benefit of U.S. Provisional Patent Application No. 62/562,808, filed Sep. 25, 2017, the entire teachings and disclosure of which are incorporated herein by reference thereto.

FIELD OF THE INVENTION

This invention generally relates to diving gear and more particularly to tank cinches for strapping down a breathing gas tank.

BACKGROUND OF THE INVENTION

In scuba diving, a diver uses a self-contained underwater breathing apparatus (scuba). Typically, scuba divers carry their own source of breathing gas, usually in a cylindrical tank, as part of their scuba gear. The tank is carried by the diver with the help of a buoyancy compensator, referred to as a BC. BC's may be a vest or back pack worn by the diver. The BC utilizes a strap, belt or webbing to secure the tank to the BC.

Securing the tank to the BC is important in scuba diving. If the tank is not tightly connected to the BC then it can shift in position during the dive which could result in separation of the tank from the conduit supplying air to the diver. Further, if the connection of the tank to the BC is too loose or improperly done, the tank could separate from the BC which means it could fall off the diver. Such a fall, could prevent air from reaching the diver.

Unfortunately, prior art cinch designs are complex, costly to manufacture and for divers not properly trained, hard to understand how to use. In other words, because the cinches of prior art designs are hard to understand and use, then divers are at risk of improperly securing their tanks to their BC's, which in turn could lead to the risks discussed above during a dive. Further, the physical location of prior art cinch designs may be subject to being opened inadvertently too easily such that the tanks they are securing being loose and causes the difficulties discussed above.

BRIEF SUMMARY OF THE INVENTION

In one aspect, an embodiment of the invention provides a back pack cinch for a strap securing a breathing tank to a buoyancy compensation device worn by a diver. The back pack cinch includes a cinch body. A cover is rotatably mounted to the cinch body. The cover has an open position and a closed position. The cover in the closed position is configured to tension a strap. A tab is rotatably mounted to the cinch body. The tab has an open position and a closed position. In the closed position, a portion of the strap is pressed against the serrated bearing surface by the tab to hold the portion of the strap in a fixed position.

In yet another aspect, an embodiment of the invention provides a back pack cinch for a strap securing a breathing tank to a buoyancy compensation device worn by a diver. The back pack cinch includes a cinch body. The back pack cinch also includes a cover arranged to rotate about a pivot pin between an open position and a closed position. A tab has a cam with a toothed portion and a planar portion. At least a portion of the tab is covered by the cover when the cover is in the closed position.

In still another aspect, an embodiment of the invention provides a buoyancy compensation device configured to secure a breathing tank. The buoyancy compensation device includes a buoyancy compensation body configured to be worn by a diver. A strap is arranged to surround the breathing tank and at least a part of the buoyancy compensation body. A back pack tank cinch has a cinch body configured to receive a first end portion of the strap and a second end portion of the strap to secure the breathing tank to the buoyancy compensation device. A cover is rotatably mounted to the cinch body. The cover has an open position and a closed position. A tab is rotatably mounted to the cinch body. The tab has an open position and a closed position. The cover in the closed position overlaps at least a portion of the tab.

In an embodiment, the cover in the closed state covers at least a portion of the tab.

In an embodiment, the tab includes a lever. An end of the lever is covered at least partially by the cover in the closed position of the cover and uncovered in the open position of the cover.

In an embodiment, the tab includes a lever having a toothed portion and a cam having a planar portion.

In an embodiment, the tab is biased closed when the cover is in the open position and in the closed position.

In an embodiment, the cam is biased to move in the first rotational direction to close the tab and second rotational direction, opposite the first rotational direction to open the tab.

In an embodiment, in the open state of the cover, a first part of the tooth portion of the tab is biased to bear against the strap of the buoyancy compensation device to sandwich the strap between the first part of the tooth portion and a serrated bearing surface.

In an embodiment, in the open state of the cover, a first part of the tooth portion of the tab is biased to bear against the strap of the bouncy compensation device to sandwich the strap between the first part of the tooth portion and a serrated bearing surface.

In an embodiment, during transition from the open state to the closed state of the cover, the tab rotates in the first rotational direction and a second part of the toothed portion of the tab faces the serrated bearing surface of the buoyancy compensation device. The second part includes at least the first part.

In an embodiment, in the closed state the cover of the cinch body is between a back of the diver and the buoyancy compensation device.

In an embodiment, the tab is biased to rotate in a first rotational direction to fix the strap between the toothed portion of the cam and a serrated bearing surface and in a second rotational direction opposite the first rotational direction to open a channel defined between the planar portion of the cam and the serrated bearing surface.

In an embodiment, the strap remains fixed between the toothed portion of the cam and the serrated bearing surface when the cover is pivoted between the open position and the closed position and between the closed position and the open position.

In an embodiment, the tab remains in the closed position when the cover is rotated from the closed position to the open position.

In an embodiment, the tab includes a cam having a toothed portion and a planar portion, the tab biased to have the toothed portion bear against the strap and a cooperating serrated bearing surface to fix the second end portion of the strap in place.

In an embodiment, when the buoyancy compensation body is worn by a diver, the cover lies between the diver's back and an area of the breathing tank nearest the diver's back.

In an embodiment, the cover includes a strap pin to fix the first end portion of the strap. The second end portion of the strap is fixed between the toothed portion and the serrated bearing surface and the first end is fixed to the strap pin. Rotation of the cover about the pivot pin towards the tab rotates the tab in the first direction towards the serrated bearing surface to tension the strap.

In an embodiment, the tab is configured to rotate in a second direction, opposite the first direction, when the second end portion of the strap is pulled in a direction away from the breathing tank.

In an embodiment, the tab includes a lever. The lever is arranged to rotate the cam in a second direction, opposite the first direction, when a force is applied on the lever in a direction towards the underwater breathing tank.

Other aspects, objectives and advantages of embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of embodiments of the present invention and, together with the description, serve to explain the principles of the invention. In the drawings.

While embodiments of the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Embodiments of the invention provide back pack cinch that quickly and safely pre-tensions a strap to secure a breathing tank to a buoyancy compensator device, also referred to as a BC, before a final tensioning is provided by the back pack cinch. BC's may be a vest or back pack worn by the diver as readily understood by those familiar with the art. These and other advantages of the invention, as well as additional inventive features, will be apparent from the description of the invention provided herein.

Figure 1:
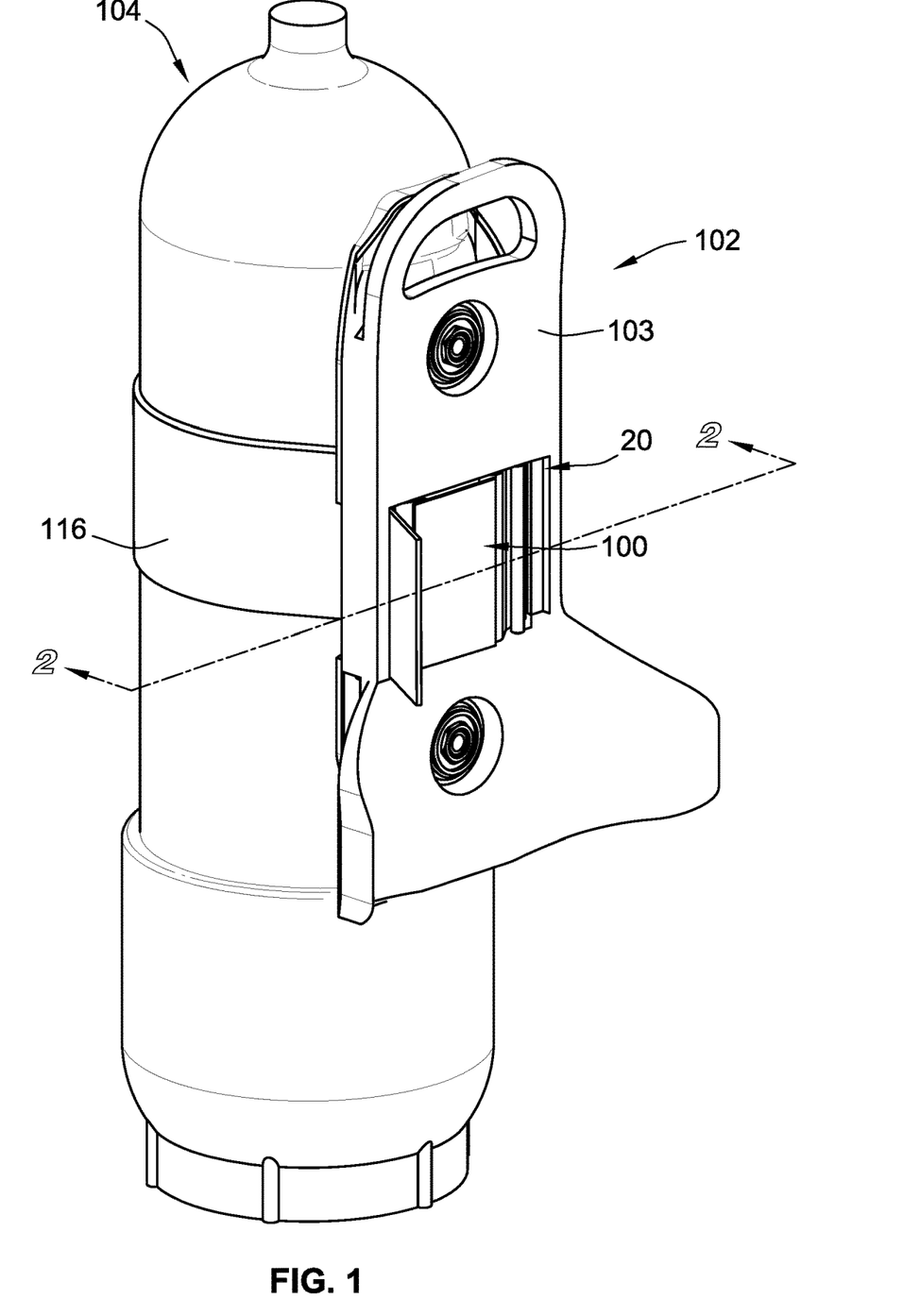
FIG. 1 is a perspective view of a back pack cinch in a closed position securing a buoyancy compensation device to a breathing tank with a strap.

FIG. 1 illustrates a back pack cinch 100 in a closed position and at least partially within a cavity 20 of a buoyancy compensation device 102, also referred to as a BC 102, to secure a breathing tank 104 to a diver (not illustrated) with a strap 116. The BC 102 may include a BC body 103 that may be a vest or back pack or in other forms commonly understood in the art. While a cavity 20 is illustrated it is not the intent to limit embodiments of a BC to only those having a cavity 20.

Figure 2A:
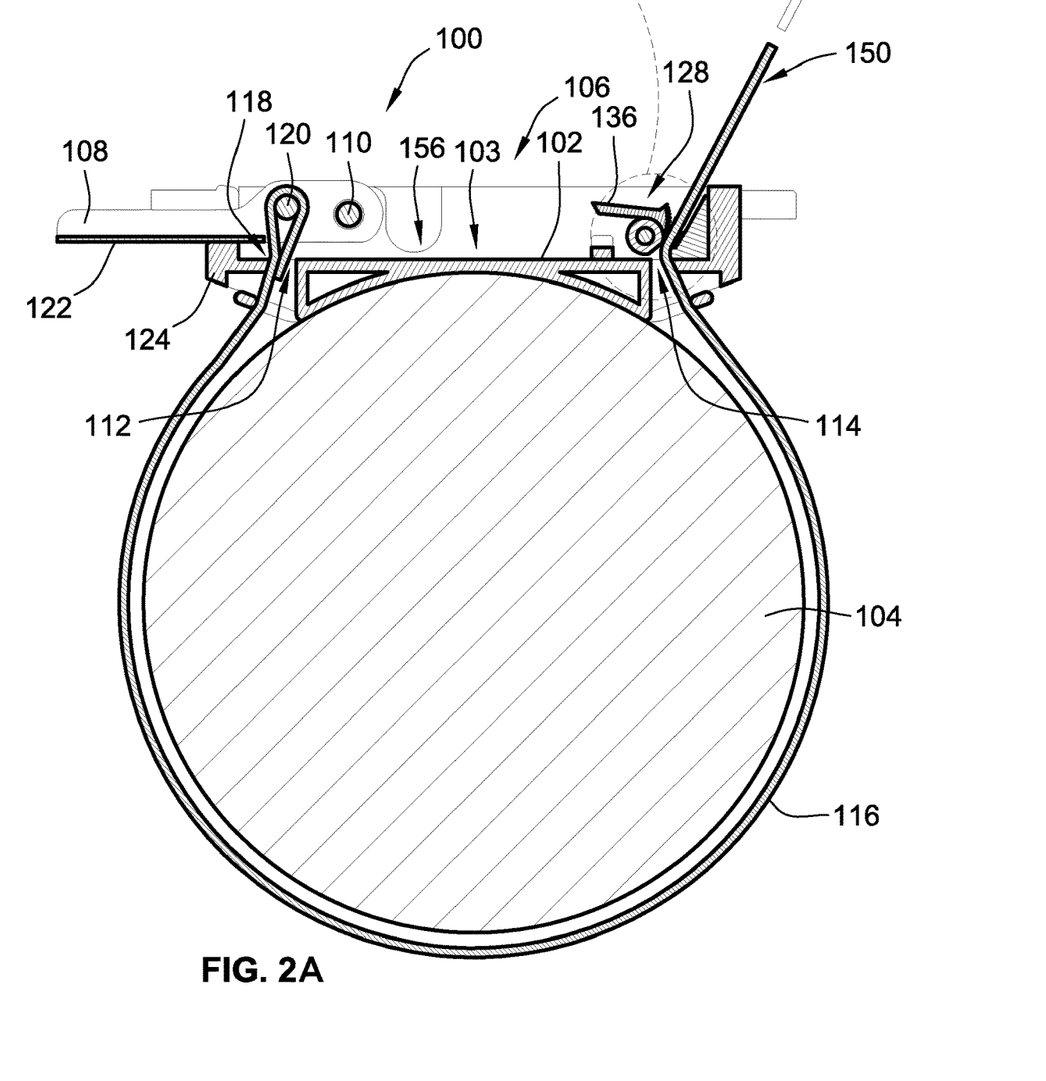
FIGS. 2A and 2B are schematic cross sections taken about line 2-2 of FIG. 1 but with the back pack cinch in an open position with a tab in a closed position according to the teachings of the instant invention.
Figure 2B:
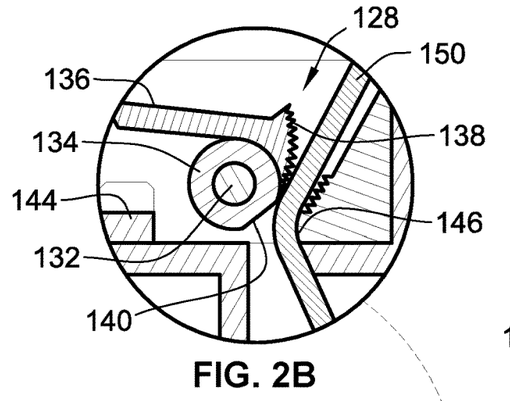

FIGS. 2A and 2B are schematic cross sections taken about line 2-2 of FIG. 1 of the back pack cinch 100 but with the back pack cinch 100 in the open position. The back pack cinch 100 includes a cinch body 106. Cinch body 106 may include a cover 108 that rotates at least partially around pivot pin 110. Pivot pin 110 may by entirely within cinch body 106 or in an embodiment may extend through the cinch body 106 to secure the back pack cinch 100 to the BC 102. The back pack cinch 100 may be permanently fixed in the BC 102 or in embodiments may be removable joined to the BC 102. Further, the cinch body 106 may be a separate structure apart from the BC body 103 such that it can be "dropped in" or "snapped in" the BC 102.

The cinch body 106 defines first aperture 112 and second aperture 114 for receiving a strap 116. The strap 116, may be a webbing or any suitable material known in the art of diving for securing a breathing tank 104 to a BC 102 and diver.

A first end portion 118 of the strap 116 is fastened about a strap pin 120 of the cinch body 106 and exits out of the first aperture 112 to wrap circumferentially around the breathing tank 104. Securing of the first end portion 118 to the strap pin 120 may be done by any known method in the art including, by way of non-limiting examples, use of fasteners or stitching such that the first end portion 118 of the strap 116 is able to remain fixed in place at the first strap pin 120 when under tension to secure the breathing tank 104 to the BC 102.

The back pack cinch 100 is shown in a first state, referred to as the open position. When the back pack cinch 100 is open, a top surface 122 of the cover 108 rests against a first stop 124 that may be provided by the BC 102. Thus, the cover 108 is also considered to be in an open position. The strap pin 120 rests within a second stop 126 (see FIGS. 4A and 4B) which is a groove that cooperates with the outer surface of the strap pin 120 to receive and bear against the outer surface of the strap pin 120 to act as a stop to prevent rotation of the back pack cinch 100 beyond what is shown in FIGS. 2A and 2B.

The cinch body 106 includes a tab 128 which includes a tab pin 132 to fasten the tab 128 to the cinch body 106. Tab 128 is arranged to rotate around the tab pin 132 within limits. The tab 128 includes a cam 134 and a lever 136. The lever 136 defines a planar surface sufficient to permit a diver and/or user to press the tab 128 in order to rotate the tab 128 about the tab pin 132 until it reaches a third stop 144 limit of the tab 128 as it rotates to an open position (see FIGS. 4A and 4B). The lever 136 further includes a toothed portion 138 that extends from a circumferential portion of the cam 134. The cam 134 further defines an outermost planar surface 140.

The cam 134 may include the circumferential toothed portion 138 and the outermost planar surface 140 and the lever 136 which extends from the cam 134 such that a forces acting on the lever 136 may rotate the cam 134 and its toothed portion 138 and planar surface 140 between the closed and open state of the cam 134.

The tab 128 is biased by a biasing member (not illustrated), in a first closed state referred to as a first closed position such that the toothed portion 138 of the cam 134 bears against a serrated bearing surface 146. The serrated bearing surface may be part of the cinch body 106 or in an embodiment part of the BC 102. The serrated bearing surface cooperates with the toothed portion 138 of the cam 134. Thus, in FIGS. 2A and 2B it can be appreciated that the tab 128 is biased to rotate in a first direction to keep the tab 128 in a first closed position. The biasing member may be a spring such that the tab 128 may be considered a spring-loaded tab 128. For example, the biasing member may a torsion spring surround tab pin 132 and acting on cam 134. Alternatively, the biasing member may be tension alone.

FIGS. 2A and 2B illustrate the back pack cinch 100 in an open position. The top surface 122 bears against the first stop 124, the strap pin 120 is located in the second stop 126, the tab 128 is in a first closed position such that the lever 136 is not resting against the third stop 144 and at least a first part of the toothed portion 138 of the tab 128 faces the serrated bearing surface 146 of the BC 102.

In order to secure the breathing tank 104 to the BC 102 using the back pack cinch 100, the first end portion 118 of the strap 116 is secured around the strap pin 120. The strap 116 passes through the first aperture 112 through the BC 102 and circumferentially surrounds the breathing tank 104. Rotation of the lever 136 (see FIGS. 4A and 4B) towards the third stop 144, by pressing 166 the lever 136 tab 128 moves to the open position. As the tab 128 moves to the open position a channel 148 (see FIGS. 4A and 4B) is opened to allow a second end portion 150 to pass between the toothed portion 138 of the tab 128 and the serrated bearing surface 146 of the BC 102. Even if the lever 136 is not pressed, an effort to push the strap 116 in a direction extending away from the breathing tank 104 and the second aperture 114 and between the tooth portion 138 of the tab 128 and the serrated bearing surface 146 may be sufficient to rotate the tab 128 to the open position to allow the strap 116 to pass between the toothed portion 138 and the serrated bearing surface 146.

Once the strap 116 is in place and there is no force action on the lever 136, tab 128 is free to rotate in the first direction to the first closed state such that the second end portion 150 of the strap 116 is sandwiched between a first part of the teeth of the first toothed portion 138 and the serrated bearing surface 146. The second end portion 150 of the strap 116 is then pulled in a first direction 152 to hand tighten the strap 116 to the breathing tank 104 as much as possible. Once the pulling force is stopped the second end portion 150 of the strap may be let go of and the tab 128 is biased to rotate in the first direction closed to keep the second end portion 150 locked/fixed in place between the first toothed portion 128 and the serrated bearing surface 146. This self-locking function of the tab 128 prevents the strap 116 from moving a second direction, opposite the first direction. Thus, the self-locking function of the tab 128 keeps the strap 116 in a first state of tension, also referred to as pre-tensioned state to secure the breathing tank 104 to the BC 102. Thus, the self-locking tab 128 holds the strap 116 fixed in place between tab 128 and the serrated bearing surface 146.

Figure 3A:
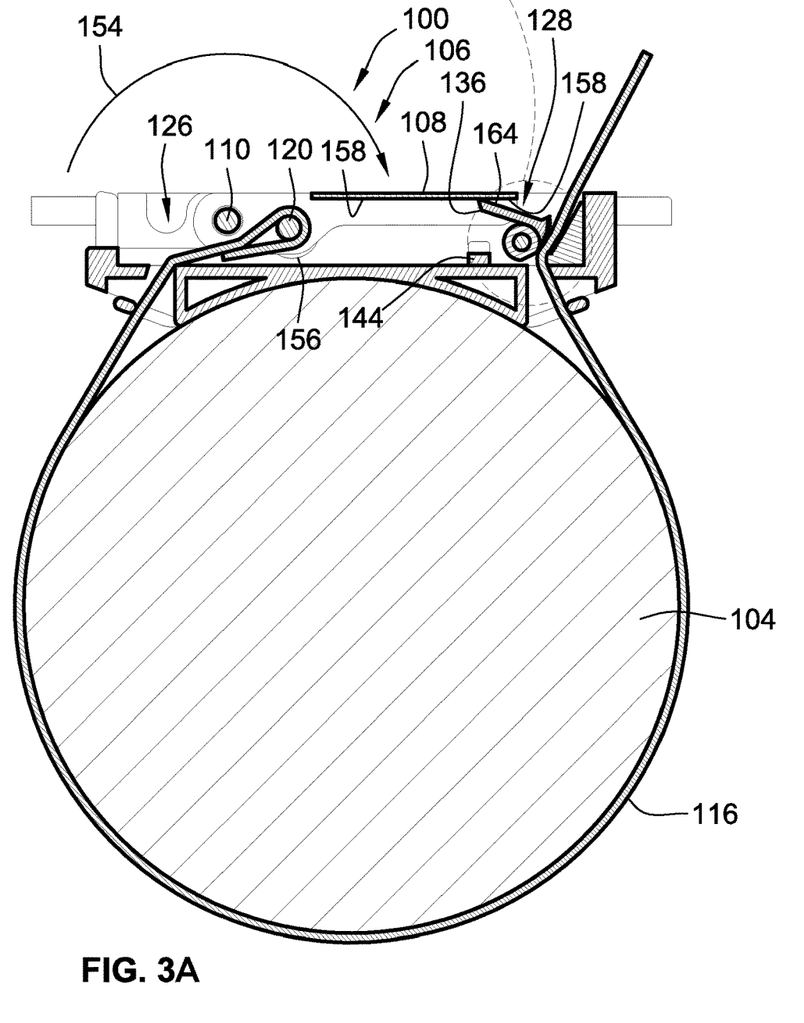
FIGS. 3A and 3B illustrate a schematic cross sections of the back pack cinch of FIG. 1 with the back pack cinch in a closed position.
Figure 3B:
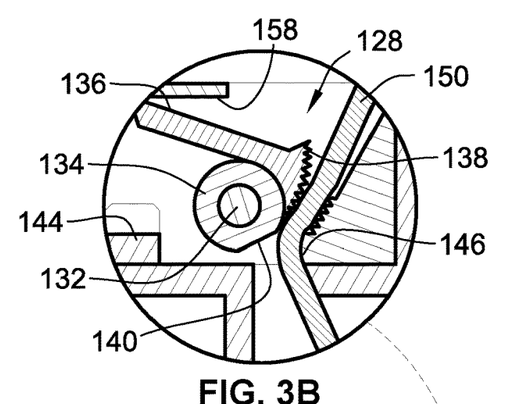

FIGS. 3A and 3B illustrate the back pack cinch 100 and the cover 108 in the closed position. To rotate the back pack cinch 100 to the closed position, the cover 108 is rotated around pivot pin 110 towards the tab 128 in the first rotation direction shown by the large arrow 154. In the closed position of back pack cinch 100, the strap pin 120 bears against a fourth stop 156 defined by the cinch body 106. Rotating the cover 108 to the closed position creates a second tensioning force greater than the pre-tensioning force to secure the strap 120 tightly around the breathing tank 104 and the BC 102.

During the rotation of the cover 108 to the closed position and in the closed position of the cover 108 and thus the back pack cinch 100, the lever 136 rotates up and away from the third stop 144 such that a second part of the toothed portion 138 bear against the strap 116 when the back pack cinch 100 is fully closed such that pivot pin 120 bears against the fourth stop 156. The second part of the toothed portion 138 includes more teeth bearing against the serrated bearing surface 146 than when the first part of the toothed portion 138 bears against the strap 116 and the serrated bearing surface 146.

In the closed position of the cover 108, the strap 116 is in a final tensioned state to fully secure the BC 102 to the breathing tank 104. The tension in the strap 116 at the tab 128 is such that the biasing force keeping the tab 128 closed/locked is greater than what it was before the cover 108 was closed.

In the closed position of the cover 108, a bottom surface 158 of the cover 108 advantageously covers, and in doing so may be said to overlap at least an end 164 the tab 128 to prevent an unintentional release of the strap 116. Thus, the bottom surface 158 of the cover 108 faces and may even be in contact with the end 164 of the tab 128 and can be considered as a fifth stop preventing further rotation of the tab 128. It can also now be readily understood that the back pack cinch 100 is further protected from inadvertent openings because it rests between the BC 102 and the diver's back when the BC 102 is worn by a diver. Thus, the cover 108 of the back pack cinch 100 cannot rotate open fully as the diver's back acts as a stop to stop any cover rotation to open the back pack cinch 100.

As can now be appreciated, the over center rotation of the cover 108 to the closed position of the back pack cinch 100 keeps the cover 108 locked into the closed position without the need for any further structure on the BC 102 or back pack cinch 100 to keep the cover 108 closed. Further, a deliberate force by a user/diver is required to rotate the cover 108 back into the open position. Thus, the cover 108 in the closed position is not likely to open with an inadvertent blow/force such as incidental contact with another diver, by way of example. Further, even if an opening of the cover 108 were to occur such that the cover 108 moves back to its open position (see FIGS. 2A and 2B), as previously discussed, the tab 128 in its biased closed position which may also referred to as a second close position, keeps the strap 116 secured to the breathing tank 104 and BC 102.

Figure 4A:
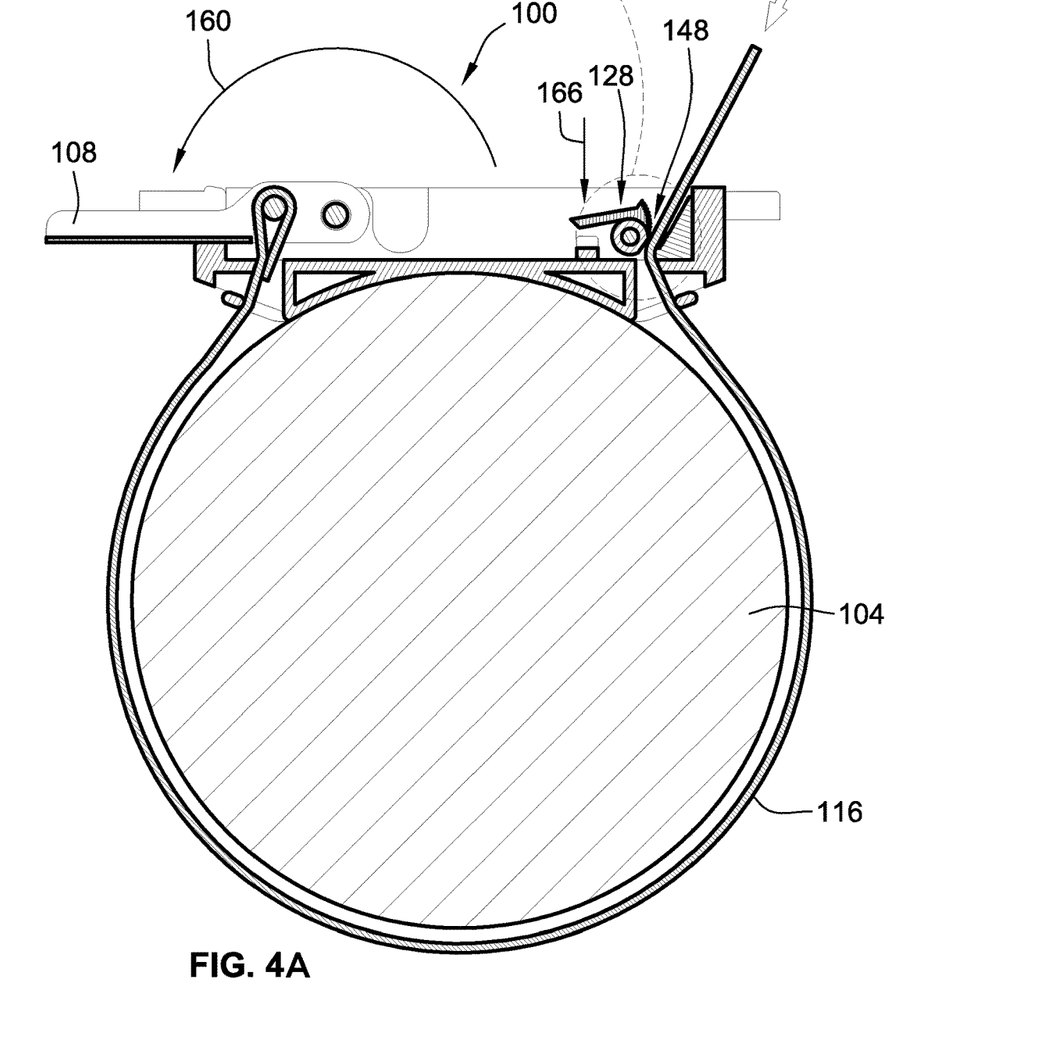
FIGS. 4A and 4B illustrate schematic cross sections of the back pack cinch of FIGS. 2A and 2B with the tab in an open position.
Figure 4B:
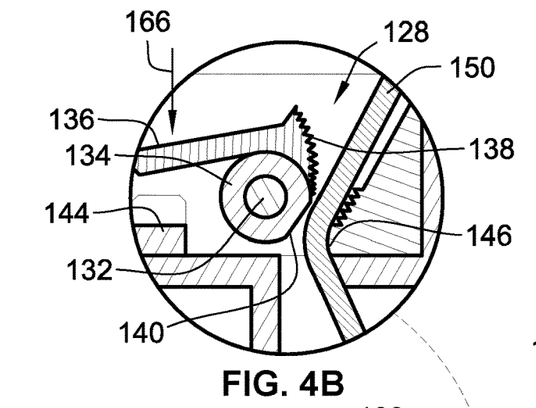

FIGS. 4A and 4B provide a second illustration of the back pack cinch 100 in the open position as in FIGS. 3A and 3B. However, FIGS. 4A and 4B further illustrate that in order to unthread the strap 116 from the back pack cinch 100, the cover 108 is rotated away from the tab 128 in a second rotational direction 160, opposite the first rotational direction 154. Once the cover 108 is in the open state, the lever 136 of the tab 128 may be depressed in the direction 160 such that the channel 148 is defined by the planar surface 140 that is free of any teeth and the serrated bearing surface 146. The strap 116 is then free to be pulled in second pulling direction 162 opposite the first pulling direction 152 (see FIGS. 3A and 3B) to completely remove the strap 116 from back pack cinch 100 or to remove a portion of the strap 116 to loosen the strap 116 such that the breathing tank 104 may be easily removed from the BC 102.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A back pack cinch for a strap securing a breathing tank to a buoyancy compensation device worn by a diver, the back pack cinch comprising:
    a cinch body having a serrated bearing surface;
    a cover rotatably mounted to the cinch body, the cover having an open position and a closed position, wherein in the closed position, the cover is configured to tension a strap; and
    a tab rotatably mounted to the cinch body, the tab having an open position and a closed position, wherein in the closed position, a portion of the strap is pressed against the serrated bearing surface by the tab to hold the portion of the strap in a fixed position.

2. The back pack cinch of claim 1, wherein the cover in the closed position, covers at least a portion of the tab.

3. The tank cinch of claim 2, wherein the tab includes a lever, an end of the lever covered at least partially by the cover in the closed position of the cover and uncovered in the open position of the cover.

4. The back pack cinch of claim 3, wherein the tab is biased closed when the cover is in the open position and in the closed position.

5. The back pack cinch of claim 2, wherein in the closed position the cover is between a back of the diver and the buoyancy compensation device.

6. A back pack cinch for a strap securing a breathing tank to a buoyancy compensation device worn by a diver, the back pack cinch comprising:
    a cinch body having a serrated bearing surface,
    a cover rotatably mounted to the cinch body, the cover having an open position and a closed position, wherein in the closed position, the cover is configured to tension a strap,
    a tab rotatably mounted to the cinch body, the tab having an open position and a closed position, wherein the closed position, a portion of the strap is pressed against the serrated bearing surface by the tab to hold the portion of the strap in a fixed position; and
    wherein the tab includes a lever having a toothed portion and a cam having a planar portion.

7. The back pack cinch of claim 6, wherein in the open position of the cover a first part of the toothed portion of the tab is biased to bear against the strap of the buoyancy compensation device to sandwich the strap between the first part of the toothed portion and the serrated bearing surface.

8. The back pack cinch of claim 7, wherein during transition from the open position to the closed position of the cover, the tab rotates in a first rotational direction and a second part of the toothed portion of the tab faces the serrated bearing surface of the buoyancy compensation device and wherein the second part includes at least the first part.

9. A back pack cinch for a strap securing a breathing tank to a buoyancy compensation device worn by a driver, the back pack cinch comprising:
    a cinch body having a serrated bearing surface;
    a cover rotatably mounted to the cinch body, the cover having an open position and a closed position, wherein in the closed position, the cover is configured to tension a strap;
    a tab rotatably mounted to the cinch body, the tab having an open position and a closed position, wherein the closed position, a portion of the strap is pressed against the serrated bearing surface by the tab to hold the portion of the strap in a fixed position,
    wherein the cover in the closed position, covers at least a portion of the tab;
    wherein the tab includes a lever, an end of the layer covered at least partially by the cover in the closed position of the cover and uncovered in the open position of the cover;
    wherein the tab is biased closed when the cover is in the open position and in the closed position; and
    wherein the cam is movable in a first rotational direction to close the tab and in a second rotational direction, opposite the first rotational direction to open the tab.

10. The back pack cinch of claim 9, wherein the tab is arranged to define a channel between a planar portion of the cam and the serrated bearing surface when the tab is rotated in the second rotational direction, opposite the first rotational direction.

11. A back pack cinch for a strap securing a breathing tank to a buoyancy compensation device worn by a diver, the back pack cinch comprising:
    a cinch body having a serrated bearing surface;
    a cover arranged to rotate about a pivot pin between an open position and a closed position;
    a tab having a cam with a toothed portion and a planar portion;
    wherein at least a portion of the tab is covered by the cover when the cover is in the closed position.

12. The back pack cinch of claim 11, wherein the tab is movable in a first rotational direction to fix the strap between the toothed portion of the cam and a serrated bearing surface and in a second rotational direction opposite the first rotational direction to open a channel defined between the planar portion of the cam and the serrated bearing surface.

13. A back pack cinch for a strap securing a breathing tank to a buoyancy compensation device worn by a diver, the back pack cinch comprising:
   a cinch body;
   a cover arranged to rotate about a pivot pin between an open position and a closed position;
   a tab having a cam with a toothed portion and a planar portion;
   wherein at least a portion of the tab is covered by the cover when the cover is in the closed position,
   wherein the strap remains fixed between the toothed portion of the cam and a serrated bearing surface of the cinch body when the cover is pivoted between the open position and the closed position and between the closed position and the open position.

14. A buoyancy compensation device configured to secure a breathing tank; the buoyancy compensation device comprising:
   a buoyancy compensation body configured to be worn by a diver;
   a strap arranged to surround the breathing tank and at least a part of the buoyancy compensation body;
   a back pack tank cinch having a cinch body configured to receive a first end portion of the strap and a second end portion of the strap to secure the breathing tank to the buoyancy compensation device;
   a cover rotatably mounted to the cinch body, the cover having an open position and a closed position;
   a tab rotatably mounted to the cinch body, the tab having an open position and a closed position,
   wherein the cover in the closed position overlaps at least a portion of the tab, and wherein one of the cinch body and buoyancy compensation body provides a serrated bearing surface.

15. The buoyancy compensation device of claim 14, wherein the tab remains in the closed position when the cover is rotated from the closed position to the open position.

16. The buoyancy compensation device of claim 15, wherein when the buoyancy compensation body is worn by the diver, the cover lies between a back of the diver and an area of the breathing tank nearest the diver's back.

17. The buoyancy compensation device of claim 14, wherein the tab includes a cam having a toothed portion and a planar portion, the tab biased to have the toothed portion bear against the strap and a cooperating serrated bearing surface to fix the second end portion of the strap in place.

18. A buoyancy compensation device configured to secure a breathing tank; the buoyancy compensation device comprising:
   a buoyancy compensation body configured to be worn by a diver;
   a strap arranged to surround the breathing tank and at least a part of the buoyancy compensation body;
   a back pack tank cinch having a cinch body configured to receive a first end portion of the strap and a second end portion of the strap to secure the breathing tank to the buoyancy compensation device;
   a cover rotatably mounted to the cinch body, the cover having an open position and a closed position;
   a tab rotatably mounted to the cinch body, the tab having an open position and a closed position,
   wherein the cover in the closed position overlaps at least a portion of the tab,
   wherein tab includes a cam having a toothed portion and a planar portion, the tab biased to have the toothed portion bear against the strap and a cooperating serrated bearing surface to fix the second end portion of the strap in place; and
   wherein the cover includes a strap pin to fix the first end portion of the strap, wherein when the second end portion is fixed between the toothed portion and the serrated bearing surface and the first end portion is fixed to the strap pin, rotation of the cover about the pivot pin towards the tab rotates the tab in a first direction towards the serrated bearing surface to tension the strap.

19. The buoyancy compensation device of claim 18, wherein the tab is configured to rotate in a second direction, opposite the first direction, when the second end portion of the strap is pulled in a direction away from the breathing tank.

20. The buoyancy compensation device of claim 18, wherein the tab includes a lever, the lever arranged to rotate the cam in a second direction, opposite the first direction, when a force is applied on the lever in a direction towards the underwater breathing tank.

* * * * *

UNITED STATES PATENT AND TRADEMARK OFFICE
CERTIFICATE OF CORRECTION

PATENT NO. : 10,717,507 B2
APPLICATION NO. : 16/137188
DATED : July 21, 2020
INVENTOR(S) : Joseph B. Stella et al.

It is certified that error appears in the above-identified patent and that said Letters Patent is hereby corrected as shown below:

On the Title Page

In the abstract: Line 3 reads "driver are provided. The back pack cinch includes a cinch" and should read --diver are provided. The back pack cinch includes a cinch--

In the Specification

Column 2, Lines 33-37 read "In an embodiment, in the open state of the cover, a first part of the tooth portion of the tab is biased to bear against the strap of the buoyancy compensation device to sandwich the strap between the first part of the tooth portion and a serrated bearing surface." and should read --In an embodiment, the tab is arranged to define a channel between the planar portion of the cam and the serrated bearing surface when the tab is rotated in the second rotational direction, opposite the first rotational direction.--

Column 2, Line 40 reads "the strap of the bouncy compensation device to sandwich the" and should read --the strap of the buoyancy compensation device to sandwich the--

In the Claims

Column 8, Line 26 Claim 9, reads "to a buoyancy compensation device worn by a driver, the" and should read --to a buoyancy compensation device worn by a diver, the--

Column 8, Line 34 Claim 9, reads "an open position and a closed position, wherein the" and should read --an open position and a closed position, wherein in the--

Signed and Sealed this
Fifteenth Day of September, 2020

Andrei Iancu
*Director of the United States Patent and Trademark Office*